(12) United States Patent
Chen et al.

(10) Patent No.: US 11,212,666 B2
(45) Date of Patent: Dec. 28, 2021

(54) DEVICE OF MANAGING AND SCHEDULING SIM CARD RESOURCE, COMMUNICATION TERMINAL AND SYSTEM

(71) Applicant: SHENZHEN UCLOUDLINK NEW TECHNOLOGY CO., LTD., Shenzhen (CN)

(72) Inventors: Jingbing Chen, Shenzhen (CN); Zhihui Gong, Shenzhen (CN)

(73) Assignee: Shenzhen Ucloudlink New Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/039,967

(22) Filed: Sep. 30, 2020

(65) Prior Publication Data
US 2021/0021986 A1 Jan. 21, 2021

Related U.S. Application Data

(63) Continuation-in-part of application No. PCT/CN2020/073246, filed on Jan. 20, 2020.

(30) Foreign Application Priority Data

Jun. 21, 2019 (CN) .......................... 201910541147.4

(51) Int. Cl.
| | |
|---|---|
| *H04W 8/18* | (2009.01) |
| *H04W 8/20* | (2009.01) |
| *H04W 8/22* | (2009.01) |
| *H04W 24/08* | (2009.01) |

(52) U.S. Cl.
CPC ............. *H04W 8/183* (2013.01); *H04W 8/22* (2013.01); *H04W 24/08* (2013.01)

(58) Field of Classification Search
CPC ....... H04W 8/183; H04W 8/22; H04W 24/08; H04W 8/205; H04W 24/04
See application file for complete search history.

(56) References Cited

U.S. PATENT DOCUMENTS

| | | | |
|---|---|---|---|
| 2016/0050556 A1* | 2/2016 | Zhao | H04W 48/18 455/432.1 |
| 2017/0094500 A1* | 3/2017 | Zhong | H04B 1/3816 |
| 2018/0176976 A1* | 6/2018 | Liu | H04W 76/10 |
| 2018/0191913 A1* | 7/2018 | Zhang | H04W 4/24 |

FOREIGN PATENT DOCUMENTS

| | | |
|---|---|---|
| CN | 104717720 A | 6/2015 |
| CN | 106028305 A | 10/2016 |
| CN | 110267256 A | 9/2019 |

* cited by examiner

*Primary Examiner* — Joseph E Dean, Jr.
(74) *Attorney, Agent, or Firm* — Robert L. Stearns; Dickinson Wright, PLLC

(57) ABSTRACT

A device of managing and scheduling SIM card resource is provided, this device includes a card service transmitter, a card management interface, a card manager, a and a modem driver, the card service transmitter is configured to send various service instructions to the card management interface so as to transmit the various service instructions to a card manager through the card management interface; the card manager is configured to call a card physical interface to realize various service functions according to received various service instructions; the card physical interface is configured to perform an operation on the SIM card arranged on a non-modem side, and to call a modem virtual SIM card driver in a modem driver to load the SIM card arranged on the non-modem side into the modem.

8 Claims, 9 Drawing Sheets

DEVICE OF MANAGING AND SCHEDULING SIM CARD RESOURCE, COMMUNICATION TERMINAL AND SYSTEM

CROSS-REFERENCE TO RELATED APPLICATION

This present application is a continuation-in-part of PCT Patent Application Serial No. PCT/CN2020/073246, filed on Jan. 20, 2020, which claims priority to Chinese patent application No. 201910541147.4 on Jun. 21, 2019, and entitled "Device of Managing and Scheduling SIM Card Resource, Communication Terminal, and System," the entire disclosures of which are incorporated herein by reference in their entireties.

TECHNICAL FIELD

The present disclosure belongs to the technical field of mobile communications, and particularly relates to a device of managing and scheduling SIM card resource, a communication terminal, and a system of managing and scheduling SIM card resource.

BACKGROUND

With the rapid development in the field of mobile communications, applications of intelligent terminals (such as a mobile phone) are increasingly applied deeply in every aspect of our lives, obtaining services from a carrier's network through a SIM (Subscriber Identity Module) card may be realized by arranging the SIM card (e.g., a SIM card or USIM card) in the intelligent terminal. In the prior art, with the continuous development of people's social circles, in order to avoid work from mixing with life, a user often need to prepare multiple SIM cards to separate a telephone for work from a telephone for life.

Types of SIM cards which are supported by an existing mobile terminal include a SIM card inserted into a SIM card slot directly and loaded into a modem, an e-SIM (Embedded Subscriber identity Module) card fixedly arranged on a device, and a soft card downloaded into a device through a special channel, etc., the existing various types of SIM cards are usually loaded into the modem directly, so that the modem may only load limited SIM card resources owing to limited numbers of SIM card physical interfaces of the modem, and thus the number of SIM cards that may be used is limited; when a plurality of SIM cards of the user need to be used, these SIM card needs to be replaced manually, however, an unplugged SIM card may not be used to perform dialing or receive an incoming call. Moreover, when there is no need to use a SIM card loaded into the modem, the mobile terminal must be powered up and the SIM card must be removed, so that the resources of the SIM card may not be effectively and reasonably scheduled. Furthermore, the existing mobile terminal does not support a capacity of sharing the physical SIM card or e-SIM card in the device, the physical SIM card or the e-SIM card may only be used in the device where it is located currently.

Technical Problem

An objective of embodiments of the present disclosure is providing a device of managing and scheduling SIM card resource, a communication terminal, and a system of managing and scheduling SIM card resource, which aim at solving a traditional problem that SIM card resources may not be effectively managed.

Technical Solution

In order to solve the technical problem as mentioned above, the technical solutions adopted in the embodiments of the present disclosure are as follows:

In a first aspect, a device of managing and scheduling SIM card resource is provided, this device includes a card service transmitter configured to send various service instructions to a card management interface so as to transmit the various service instructions to a card manager through the card management interface;

the card manager, which is configured to call a card physical interface to realize various service functions according to received various service instructions, thereby performing resource management on a SIM card;

the card physical interface, which is configured to perform an operation on the SIM card arranged on a non-modem side, and to call a modem virtual SIM card driver in a modem driver to load the SIM card arranged on the non-modem side into the modem or to call a modem physical SIM card driver in the modem driver to perform an operation on the SIM card loaded into the modem.

In a second aspect, a communication terminal is provided, the communication terminal is provided with the aforesaid device of managing and scheduling SIM card resource.

In a third aspect, a SIM card resource management scheduling system is provided, the system includes:

the aforesaid communication terminal; and a cloud SIM card server, which is configured to receive various service requests sent by the card service transmitter and/or send out responses to the service requests to the card service transmitter, wherein the responses to the service requests are responses made by the cloud SIM card server according to the received various service requests sent by the card service transmitter.

Advantageous Effects

The device of managing and scheduling SIM card resource provided by the embodiments of the present disclosure has the advantageous effects reflected in that: service instructions for performing various operations on the SIM card may be sent out according to the arranged card service transmitter, and the service instructions are transmitted to the card manager through the card management interface, at this point, the card manager call the card physical interface to realize various service functions; meanwhile, performing reading and writing operation on the SIM card arranged on the non-modem side, modifying SIM card data, increasing and decreasing SIM cards, monitoring the SIM card and performing an alarming may be realized through the card physical interface; additionally, by calling the modem driver by the card physical interface, such that the SIM card arranged on the non-modem side may be loaded into the modem to perform communication through the modem driver or be shared to the cloud SIM card server to be used by other users, or some operations such as sharing, enabling, disabling, monitoring and the like may be performed on the SIM card loaded into the modem, dynamic management and allocation of resources of the various SIM cards are realized, and a management efficiency of the SIM card is effectively improved.

BRIEF DESCRIPTION OF THE DRAWINGS

In order to explain the embodiments of the present disclosure more clearly, a brief introduction regarding the accompanying drawings needed to be used for describing the embodiments or exemplary techniques is given below; it is apparent that the accompanying drawings described herein are only some embodiments of the present disclosure, the person of ordinary skill in the art may also acquire other drawings according to the current drawings on the premise of paying no creative labor.

DESCRIPTION OF THE EMBODIMENTS

Figure 1:
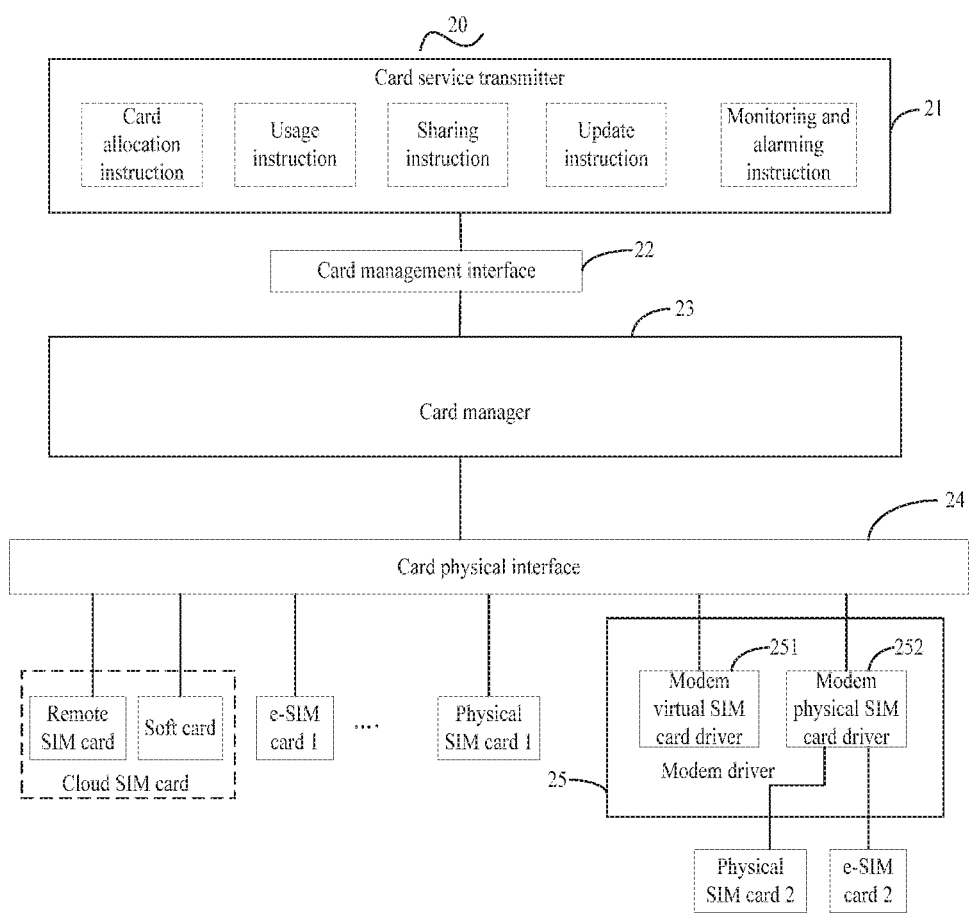
FIG. 1 illustrates a schematic structural diagram of a device of managing and scheduling SIM card resource provided by embodiment one of the present disclosure.

In order to make the purpose, the technical solution and the advantages of the present disclosure be clearer and more understandable, the present disclosure will be further described in detail below with reference to accompanying figures and embodiments. It should be understood that the specific embodiments described herein are merely intended to illustrate but not to limit the present disclosure.

It should be noted that, when one component is described to be "fixed to" or "arranged on" another component, this component may be directly or indirectly arranged on another component. When one component is described to be "connected with" another component, it may be directly or indirectly connected to the other component. Orientation or position relationships indicated by terms including "upper", "lower", "left" and "right" are based on the orientation or position relationships shown in the accompanying figures and is only used for the convenience of description, instead of indicating or implying that the indicated device or element must have a specific orientation and is constructed and operated in a particular orientation, and thus should not be interpreted as limitation to the present disclosure. For the person of ordinary skill in the art, the specific meanings of the aforesaid terms may be interpreted according to specific conditions. Terms of "the first" and "the second" are only for the purpose of describing conveniently and should not be interpreted as indicating or implying relative importance or impliedly indicating the number of indicated technical features. "Multiple/a plurality of" means two or more unless there is an additional explicit and specific limitation.

The device of managing and scheduling SIM card resource includes a card service transmitter configured to send various service instructions to a card management interface so as to transmit the various service instructions to a card manager through the card management interface; the card manager is configured to call the card physical interface to realize various service functions, thereby performing resource management on the SIM card; a card physical interface configured to perform operation on the SIM card arranged on the non-modem side, and call a modem virtual SIM card driver in the modem driver to load the SIM card into the modem or call the modem physical SIM card driver in the modem driver to perform an operation on the SIM card arranged in the modem. In the present disclosure, service instructions for performing various operations on the SIM card may be sent out according to the arranged card service transmitter, and the service instructions are transmitted to the card manager through the card management interface, at this point, the card manager calls the card physical interface to realize various service functions; meanwhile, performing reading and writing operation on the SIM card arranged on the non-modem side, modifying SIM card data, increasing and decreasing SIM cards, monitoring the SIM card and performing an alarming may be realized through the card physical interface; additionally, by calling the modem driver through the card physical interface, such that the SIM card arranged on the non-modem side may be loaded into the modem 50 to perform communication through the modem driver or be shared to the cloud SIM card server 300 to be used by other users, or some operations such as sharing, enabling, disabling, monitoring and the like may be performed on the SIM card loaded into the modem 50 by calling the modem physical SIM card driver in the modem driver, dynamic management and allocation of resources of the various SIM cards are realized, and a management efficiency of the SIM card is effectively improved.

Embodiment One

FIG. 1 illustrates a schematic structural diagram of a device 20 of managing and scheduling SIM (Subscriber Identity Module) card resource according to embodiment one of the present disclosure. As shown in FIG. 1, the device 20 of managing and scheduling SIM card resource includes:

a card service transmitter 21 which is connected with the card management interface 22 and is configured to send various service instructions to the card management interface 22 so as to transmit the various service instructions to the card manager 22 through the card management interface 22;

a card management interface 22 which is respectively connected with the card service transmitter 21 and the card manager 23 and is configured to provide a communication interface between the card service transmitter 21 and the card manager 23, such that data communication may be performed between the card service transmitter 21 and the card manager 23 through the communication interface provided by the card management interface 22;

the card manager 23 which is respectively connected with the card management interface 22 and a card physical interface 24, and is configured to call the card physical interface 24 to implement various service functions according to the received various service instructions, thereby performing resource management on the SIM card;

the card physical interface 24 which is respectively connected with the card manager 23 and the modem driver 25 and is configured to perform operation on the SIM card arranged on the non-modem side, and call the modem virtual SIM card driver 251 in the modem driver 25 to load the SIM card arranged on the non-modem side into the modem 50 or call the modem physical SIM card driver 252 in the modem driver 25 to perform an operation on the SIM card loaded into the modem 50.

Wherein, in this embodiment of the present disclosure, the device of managing and scheduling SIM card resource 20 is configured to perform resource management and scheduling on various SIM cards, wherein the SIM cards include but are not limited to, a physical SIM card, an e-SIM (Embedded Subscriber Identity Module) card, a soft SIM card, a remote SIM card, a cloud SIM card, and the like.

Specifically, these various types of SIM cards include a domestic carrier's cards such as a SIM card from carrier of China Mobile, a SIM card from carrier of China Unicom, a SIM card from carrier of China Telecommunications, a SIM card from carrier of China Tietong, etc., the SIM cards may also be a SIM card provided by a foreign mobile network carrier.

In this embodiment of the present disclosure, the e-SIM card is a SIM card configuration that supports any mobile device. The e-SIM card allows a consumer to simultaneously store multiple card configuration profiles of multiple carriers in the device. Manufacturers and carriers may currently allow the consumers to select one carrier and then download the carrier's SIM card data into any device securely.

In this embodiment of the present disclosure, the cloud SIM card may be a physical SIM card, a soft card, or other type of SIM card such as an e-SIM card, a multi IMSI (International Mobile Subscriber Identity) card which are arranged on the cloud SIM card server side. It should be understood that examples of the cloud SIM card are merely for the convenience of interpretation, the present disclosure is not limited thereto, the cloud SIM card may be selected according to actual situation.

In the embodiment of the present disclosure, the soft card is the SIM card which performs completely software operation on the physical SIM card, parameters in the soft card may be set, however, parameters in the physical SIM card are solidified and may not be modified, at this point, various SIM card data may be written in the soft card, and the written SIM card data may include, but is not limited to, one or a combination of a telephone number, an ICCID (Integrated Circuit Card Identity), IMSI (International Mobile Subscriber identity), Authentication Key, SMSC (Short Message Service Center).

In this embodiment of the present disclosure, the cloud SIM card is downloaded into the communication terminal and is taken as a soft card or a remote SIM card, wherein the remote SIM card is one of various types of SIM cards arranged on the cloud SIM card server side, when the SIM card is used to access to the communication network, operations including authentication need to be performed by the SIM card on the cloud SIM card server 300. In a specific application scenario, the type of the SIM card may be determined according to the functions of the SIM card, which is not limited herein.

Wherein the cloud SIM card server 300 is a server configured to store and manage SIM cards, centralized management and flexible scheduling may be performed on the cloud SIM card, the cloud SIM card server 300 may be a server or a server cluster consisting of several servers, or be a cloud computing service center. Wherein the cloud SIM card server 300 stores various types of cloud SIM cards which include a physical SIM card, a soft card or other types of SIM cards, and further include a SIM card shared to the cloud SIM card server 300 by the communication terminal 200 and SIM card box.

Furthermore, in one embodiment of the present disclosure, the device of managing and scheduling SIM card resource 20 is integrated into the communication terminal 200, the communication terminal 200 includes a modem, and a plurality of SIM card slots which may not be arranged at the modem side and a cloud SIM card module configured to load SIM card data, wherein the cloud SIM card module includes a soft card module and a remote SIM card module. Wherein the soft card module is configured to load soft card data, and the remote SIM card module is configured to load remote SIM card data. The modem includes an existing SIM card slot which may realize dual-card dual standby or multi-card multi-standby, at this point, the user may realize loading the physical SIM card into the modem 50 and using the SIM card by directly inserting the physical SIM card into the SIM card slot at the modem side.

Figure 2:
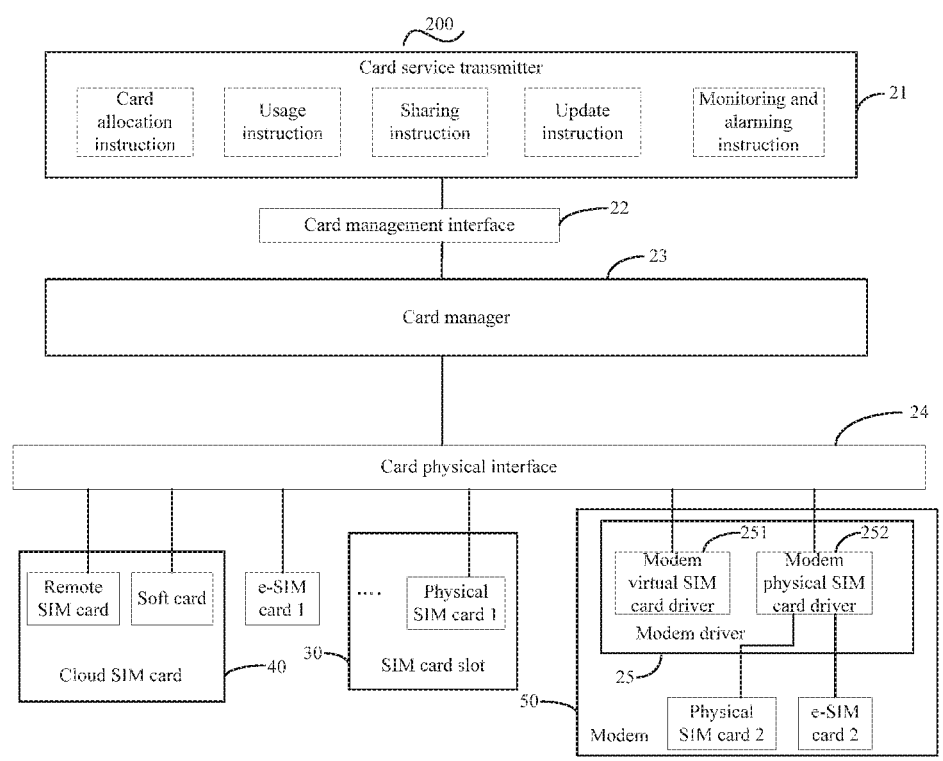
FIG. 2 illustrates a schematic structural diagram of a communication terminal provided by embodiment two of the present disclosure.

It should be noted that the communication terminal may be provided with an e-SIM card, the e-SIM card may either be directly and fixedly arranged in the modem and is used, and may also be fixedly arranged at the non-modem side. As shown in FIGS. 1 and 2, the communication terminal 200 may include an e-SIM card 1 which is arranged at the non-modem side, a physical SIM card 1, an e-SIM card 2 and a physical SIM card 2 loaded into the modem 50.

When the user inserts the physical SIM card into the SIM card slot on the non-modem side or loads the SIM card data into the soft card module and the remote SIM card module of the cloud SIM card module, data communication may not be performed due to the fact that the physical SIM card, the soft card and the remote SIM card are not arranged in the modem currently; further, when the user needs to use the physical SIM card inserted into the non-modem side or the SIM card loaded into the soft card module or the remote SIM card module to perform data communication, by controlling an application program in the communication terminal 200, such that the card physical interface 24 is enabled to load the physical SIM card, the soft card or the remote SIM card into the modem 50 by calling the modem driver 25, and realizes the use of the SIM card on the non-modem side through the modem.

In one embodiment of the present disclosure, the service instructions sent by the card service transmitter 21 include a card allocation instruction, a usage instruction, a sharing instruction, an update instruction, and a monitoring and alarming instruction. The card service transmitter 21 is configured to implement management of service logic of various SIM cards such as loading the cloud SIM card data sent by the cloud SIM card server 300 into the cloud SIM card module of the card physical interface 24 to realize card allocation and installation, loading the SIM card arranged on the non-modem side into the modem 50 to enable the SIM card, sharing the SIM card on the communication terminal 200 to the cloud SIM card server 300, performing data update on the SIM card that needs to be updated according to the obtained various update data, and monitoring status information of the SIM card, and perform alarming when the status information of the SIM card is abnormal.

In particular, in one embodiment of the present disclosure, the card physical interface 24 is configured to perform operations on various SIM cards, in particular, the card physical interface 24 may perform various interface operations on the various SIM cards, such as power up, power down, reset, and apdu request, etc. For example, the card physical interface 24 may install the cloud SIM card into the cloud SIM card module, and write and modify the cloud SIM card data so as to install and generate the cloud SIM card as required by the user, when the user controls the application program of the communication terminal 200 to send a cloud SIM card allocation instruction; when the user needs to enable the generated cloud SIM card or the SIM card arranged on the non-modem side, he/she controls the application program of the communication terminal 200 to send the usage instruction for enabling the SIM card, at this point, the card physical interface 24 calls the modem virtual SIM card driver connected with it to load the SIM card arranged on the non-modem side into the modem 50 to be used, thereby realizing mobile communication. When the user needs to share the SIM card arranged on the communication terminal 200 to the cloud SIM card server 300, he/she controls the application program of the communication terminal 200 to send a sharing instruction for sharing the SIM card, at this point, the card physical interface 24 shares the SIM card arranged on the non-modem side to the cloud SIM card server 300 or calls the modem physical SIM card driver connected with it to share the SIM card arranged in the modem to the cloud SIM card server 300, at this point, due to the plurality of SIM card slots and cloud SIM card modules arranged on the non-modem side of the communication terminal 200, effective resource scheduling of the SIM card may be realized through the card physical interface 24 under the condition that the number of interfaces of the modem is limited, so that resources of the SIM card that need to be used are loaded into the modem 50, and dynamic management and allocation of various SIM card resources is realized.

In one embodiment of the present disclosure, the card manager 23 is further configured to be instructed to call the card physical interface 24 to write the cloud SIM card data sent by the cloud SIM card server 300 into the cloud SIM card module of the card physical interface 24, to generate the SIM card determined by the card service transmitter 21 according to the card allocation instruction.

In particular, in this embodiment, the SIM card in the card allocation instruction which is sent by the card service transmitter 21 is mainly the cloud SIM card stored in the cloud SIM card server 300, the card service transmitter 21 firstly sent out a card allocation request instruction to the cloud SIM card server 300 so as to obtain the data of the cloud SIM card that needs to be allocated which is sent by the cloud SIM card server 300; further, the card service transmitter 21 sends out a card allocation instruction carrying the cloud SIM card data, and transmits the card allocation instruction to the card manager 23 through the interface provided by the card management interface 22, the card manager 23 drives the card physical interface 24 to download and write the cloud SIM card data sent by the cloud SIM card server 300 into the cloud SIM card through a specific channel, thereby realizing installation and generation of the required cloud SIM card, in this way, adding and subsequent use of the cloud SIM card without inserting the physical SIM card is realized.

In one embodiment of the present disclosure, the modem driver 25 is arranged in the modem, the modem driver 25 includes a modem virtual SIM card driver 251 configured to provide a driver for enabling the SIM card arranged on the non-modem side to be operated on the modem, such that the SIM card arranged on the non-modem side may be loaded into the modem 50 to be used or be shared to the cloud SIM card server 300, or using of the SIM card arranged on the non-modem side and loaded into the modem 50 is stopped to release the resources of the modem 50.

In one embodiment of the present disclosure, the card manager 23 is further configured to be instructed to call the card physical interface 24 in order that the card physical interface 24 calls the modem virtual SIM card driver 251 to load the SIM card arranged on the non-modem side into the modem 50 to be used, according to the usage instruction sent by the card service transmitter 21.

In particular, in this embodiment, the card service transmitter 21 sends out the usage instruction of the SIM card that needs to be used, and transmits the usage instruction to the card manager 23 through the interface provided by the card management interface 22, and the card manager 23 calls the card physical interface 24 in order that the card physical interface 24 calls the modem virtual SIM card driver 251 to load the SIM card resources arranged on the non-modem side into the modem 50, thereby realizing loading the SIM card arranged on the non-modem side into the modem 50 to be used. It should be noted that, the SIM cards that may be loaded into the modem 50 include a cloud SIM card, a physical SIM card, and an e-SIM card which are arranged on the non-modem side. Wherein the cloud SIM card includes a soft card loaded into the soft card module and a remote SIM card loaded into the remote SIM card module. It should be noted that, when a remote SIM card is used, a remote authentication operation needs to be performed by the cloud SIM card server 300.

In one embodiment of the present disclosure, the modem driver 25 further includes a modem physical SIM card driver 252 configured to provide a driver for sharing or enabling and disabling a SIM card arranged in the modem, such that the resources of SIM cards arranged in the modem may be shared to the cloud SIM card server 300, or the SIM card arranged in the modem may be enabled or disabled.

In one embodiment of the present disclosure, the card manager 23 is further configured to be instructed to call the card physical interface 24 in order that the card physical interface 24 shares the SIM card arranged on the non-modem to the cloud SIM card server 300, or to call the modem physical SIM card driver 252 to share the SIM card arranged on the modem to the cloud SIM card server 300, according to the sharing instruction sent by the card service transmitter 21.

Specifically, in this embodiment, the card service transmitter 21 sends a sharing instruction of the SIM card that needs to be shared, and transmits the sharing instruction to the card manager 23 through the interface provided by the card management interface 22. The card manager 23 is further configured to obtain the position of the SIM card that needs to be shared.

When the SIM card that needs to be shared is arranged on the non-modem side, the card manager 23 is instructed to call the card physical interface 24 to enable the card physical interface 24 to share the resources of the SIM card arranged on the non-modem to the cloud SIM card server 300 according to the sharing instruction, wherein the SIM cards that may be shared include a cloud SIM card, a physical SIM card and an e-SIM card which are arranged on the non-modem side.

When the SIM card that needs to be shared is loaded into the modem 50, the card manager 23 calls the card physical interface 24 in order that the card physical interface 24 calls the modem physical SIM card driver 252 to share the resources of the SIM card arranged in the modem to the cloud SIM card server 300, or the card physical interface 24 calls the modem virtual SIM card driver 251 to share the resource of the SIM card which is loaded into the modem 50 from the non-modem side to the cloud SIM card server 300, wherein the SIM card that may be shared include a physical SIM card or an e-SIM card arranged in the modem, or a cloud SIM card, a physical SIM card, and an e-SIM card which are loaded into the modem 50 from the non-modem side. It should be noted that, the communication terminal 200 stops a communication operation of the SIM card after the SIM card arranged in the modem device is shared.

In one embodiment of the present disclosure, the card manager 23 is further configured to be instructed to call the card physical interface 24 to update SIM card data as determined by the card service transmitter 21, according to an update instruction sent by the card service transmitter 21.

In particular, in this embodiment, when the data of the SIM card downloaded into the cloud SIM card module needs to be updated, the card service transmitter 21 sends out an update request instruction for updating the data of the SIM card that needs to be updated to the cloud SIM card server 300 to obtain update data of the SIM card that needs to be updated sent by the cloud SIM card server 300; furthermore, the card service transmitter 21 sends out an update instruction carrying the SIM card update data and transmits the update instruction to the card manager 23 through the interface communication provided by the card management interface 22, so that the card manager 23 is instructed to call the card physical interface 24 to download and write the update data of the SIM card sent by the cloud SIM card server 300 into the SIM card corresponding to the cloud SIM card module, thereby realizing data update of the SIM card that needs to be updated.

In one embodiment of the present disclosure, the card manager 23 is further configured to be instructed to call the card physical interface 24 to monitor the states of the various SIM cards determined by the card service transmitter 21, and send out an alarm when an abnormal status of the SIM card is monitored, according to the monitoring and alarming instruction sent by the card service transmitter 21.

In particular, in this embodiment, when an abnormal status of the SIM card is monitored by the card manager 23, abnormal status information and alarm information are transmitted to the card management interface 22, and the card management interface 22 transmits the abnormal status information and the alarm information to the card service transmitter 21; furthermore, the card service transmitter 21 reports the abnormal status information and the alarm information to the cloud SIM card server 300 to realize monitoring and alarming of the SIM card.

In one embodiment of the present disclosure, the service instructions sent by the card service transmitter 21 further includes a query instruction, a card deletion instruction, a card disabling instruction, a stop sharing instruction, and a file modification instruction. The service instructions are used for querying specific information of the SIM card, deleting the added generated cloud SIM card, stopping the use of the SIM card loaded into the modem 50; stopping sharing of the SIM card shared to the cloud SIM card server 300, and modifying file contents in the SIM card, and the like. It should be understood that, the examples of the service instructions sent by the card service transmitter 21 are merely for the convenience of interpretation, the present disclosure is not limited thereto, a selection may be made according to actual situation.

For example, when the card manager 23 receives the card query instruction that is used to query the SIM card and sent by the card service transmitter 21, the card manger 23 is instructed to call the card physical interface 24 to read the information of the SIM card.

When the card manager 23 receives the card deletion instruction that is used to delete the SIM card and sent by the card service transmitter 21, the card manager 23 is instructed to call the card physical interface 24 to delete the SIM card that needs to be deleted, it needs to be noted that, the SIM card that needs to be deleted is the cloud SIM card downloaded into the cloud SIM card module such as the soft card and the remote SIM card, and the like, wherein when the cloud SIM card is deleted in the communication terminal 200, the resources of the cloud SIM card of the cloud SIM card may be recycled by the cloud SIM card server 300, at this point, the cloud SIM card server 300 may reallocate the cloud SIM card to other communication terminals to be used.

When the card manager 23 receives the card disabling instruction that is used to disable the SIM card and sent by the card service transmitter 21, the card manager 23 is instructed to obtain the type of the SIM card required to be disabled, when the SIM card required to be disabled is a physical SIM card or an e-SIM card loaded into the modem 50, the card manager 23 is instructed to call the card physical interface 24 to cause the card physical interface 24 to call the modem physical SIM card driver 252 to disable the SIM card required to be disabled and release hardware resources of the modem, such that the user may load the SIM card arranged on the non-modem side into the modem 50; when the SIM card required to be disabled is a cloud SIM card, a physical SIM card, or an e-SIM card loaded into the modem 50 from the non-modem side, the card disabling module calls the card physical interface 24 to cause the card physical interface 24 to call the modem virtual SIM card driver 251 to stop loading the SIM card and releasing the hardware resources of the modem.

When the card manager 23 receives the stop sharing instruction that is used to share the SIM card sent by the card service transmitter 21, the card manager 23 is instructed to stop sharing the cloud SIM card, the physical SIM card or the e-SIM card which are required to be arranged on the non-modem side through the card physical interface 24, or call the modem virtual SIM card driver 251 to stop sharing the physical SIM card or the e-SIM card loaded into the modem 50 through the card physical interface 24, or call the modem physical SIM card driver 252 to stop sharing the cloud SIM card, the physical SIM card or the e-SIM card loaded into the modem 50 from the non-modem side through the card physical interface 24.

When the card manager 23 receives the file modification instruction that is used to modify the SIM card and sent by the card service transmitter 21, the card manager 23 is instructed to modify the file contents of the SIM card required to be modified by the card physical interface 24.

In this embodiment of the present disclosure, the service instructions for performing various operations on the SIM card may be sent according to the arranged card service transmitter 21, and the service instructions are transmitted to the card manager through the card management interface, at this point, various service functions are realized by calling the card physical interface through the corresponding sub-modules in the card manager; meanwhile, performing reading and writing operation on the SIM card arranged on the non-modem side may be realized through the card physical interface 24, in this way, modifying the data of the SIM card, adding and deleting the SIM card, and monitoring the SIM card and alarming are achieved, meanwhile, the modem driver is called through the card physical interface, so that the modem driver may realize the operation of loading the SIM card on the non-modem side into the modem 50 to perform communication or sharing the SIM card arranged on the non-modem side to the cloud SIM card server 300 to be used by other users, or realize sharing, enabling, disabling, monitoring the SIM card loaded into the modem 50, thereby realizing a dynamic management of resources of various SIM cards and effectively improving the management efficiency of the SIM card.

Embodiment Two

FIG. 2 illustrates a structural schematic diagram of a communication terminal 200 according to embodiment two of the present disclosure. As shown in FIG. 2, the communication terminal 200 is provided with a device of managing and scheduling SIM card resource 20 as shown in the embodiment one. The principle of implementation and the generated technical effects are as same as embodiment one. For the convenience of description, regarding the part that is not mentioned in this embodiment of the present disclosure, reference can be made to the relevant content in the embodiment one.

In one embodiment of the present disclosure, the communication terminal 200 includes but is not limited to a smart phone, a computer, a personal digital assistant, a tablet device, and the like. Wherein the communication terminal 200 may be provided with a plurality of SIM (Subscriber identity Module) card slots 30, an e-SIM card, and a cloud SIM card module 40 arranged on a non-modem side, wherein the cloud SIM card module 40 includes a soft card module and a remote SIM card module. Wherein the communication terminal 200 is further provided with a modem 50, and a physical SIM card may be directly inserted into the modem 50 or e-SIM (Embedded Subscriber identity Module) card may be integrated into the communication terminal 200 directly, so that the e-SIM card is directly loaded into the modem 50 to perform mobile communication, wherein the modem driver 25 is arranged within the modem 50.

At this point, the user may control and select to load the SIM card arranged on the non-modem side into the modem 50 by means of the application program of the communication terminal 200, thereby realizing standby communication, or to disable the SIM card loaded into the modem 50 to release the resources of the modem 50.

When a SIM card is used to performing a communication service such as dialing, sending short message or transmitting mobile data, the communication terminal 200 calls the SIM card loaded into the modem 50 to perform communication. The modem 50 may load the SIM card arranged on the modem 50 or on the non-modem side, in this way, resource management and scheduling may be performed on multiple SIM cards in the communication terminal 200, and a complicated problem that the SIM card in the communication terminal 200 needs to be inserted and replaced when the user needs to replace the SIM card is avoided.

One or a plurality of physical SIM cards may be inserted in the communication terminal 200 provided by this embodiment, when the communication terminal 200 is not inserted by a physical SIM card, the cloud SIM card required to be used is downloaded, and the downloaded cloud SIM card is loaded into the modem 50 to be standby and used, and the mobile communication may also be realized without inserting SIM card; when a plurality of physical SIM cards are inserted into the communication terminal 200, resource management and scheduling of different SIM cards under limited hardware resources of the modem 50 may be implemented by selecting the loaded or disabled physical SIM card. Wherein the SIM card in the communication terminal 200 may be automatically switched and used, and may also be shared to the cloud SIM card server 300, so that an external communication terminal is enabled to use the currently shared SIM card; furthermore, by monitoring the SIM card and performing an alarm, abnormality may be reported when the status of the SIM card is abnormal.

Embodiment Three

Figure 3:
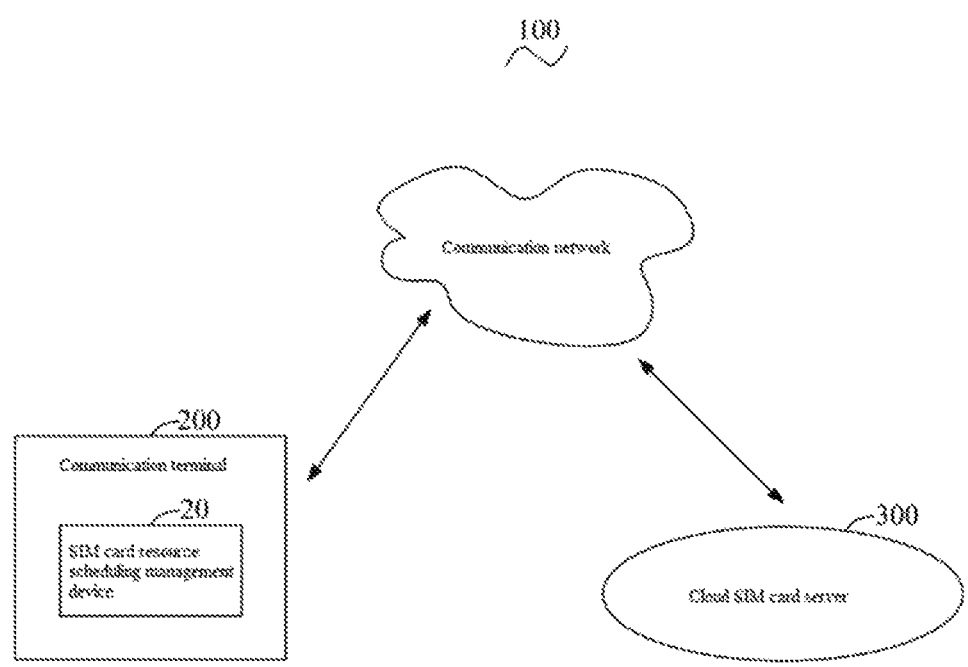
FIG. 3 illustrates a diagram of a network architecture of a system of managing and scheduling SIM card resource provided by embodiment three of the present disclosure.

FIG. 3 illustrates a network architecture diagram of a SIM card resource management scheduling system provided by this embodiment of the present disclosure, for the convenience of description, the part associated with the present disclosure is illustrated merely.

Figure 4:
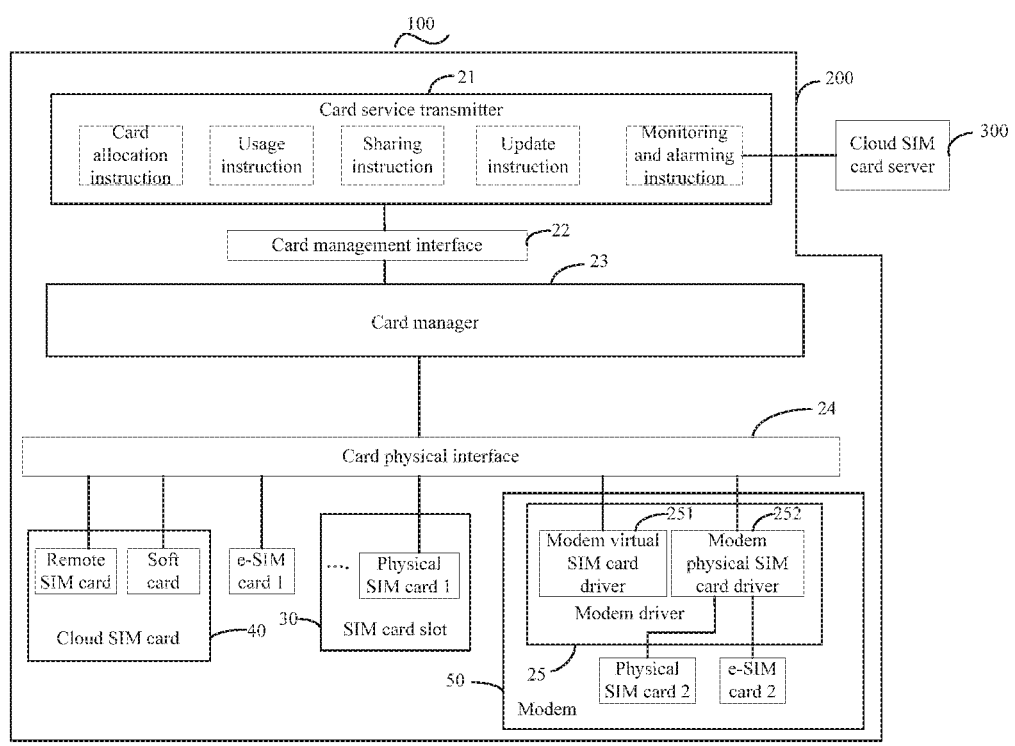
FIG. 4 illustrates a schematic structural diagram of the system of managing and scheduling SIM card resource provided by embodiment three of the present disclosure.

In particular, as shown in FIG. 4 which illustrates the SIM card resource management scheduling system 100 provided by the embodiment of the present disclosure, the SIM card resource management scheduling system 100 includes the communication terminal 200 as shown in the embodiment two and a cloud SIM card server 300 which is in wireless communication with the communication terminal 200 through a communication network. The principle of implementation of the communication terminal 200 and the generated technological effects are as same as the communication terminal 200 in embodiment two, for describing concisely, regarding the part that is not mentioned in this embodiment, reference may be made to corresponding contents in the embodiment two.

In one embodiment of the present disclosure, the communication terminal 200 is configured to communicate with the cloud SIM card server 300 over a communication network, wherein the communication network may be a smart terminal, a computer, a personal digital assistant, a tablet device, or the like. The examples of the communication terminal 200 described herein are merely for the convenience of interpretation, the present disclosure is not limited thereto, and selection may be made according to the actual situation.

In one embodiment of the present disclosure, the cloud SIM card server 300 stores various cloud SIM cards, the cloud SIM card may be physical SIM card, soft card, or other types of SIM cards such as e-SIM card, multi-IMSI (Multi International Mobile Subscriber Identity) card which are arranged in the cloud SIM card server 300, the cloud SIM card may also be a SIM card shared to the cloud SIM card server 300 by a terminal device such as a communication terminal 200. It should be understood that, the examples of the cloud SIM cards described herein are merely for the convenience of interpretation, the present disclosure is not limited thereto, and a selection may be made according to the actual situation.

As a preferable embodiment of the present disclosure, when the cloud SIM card is a physical SIM card arranged in the cloud SIM card server 300, the cloud server selects an appropriate physical SIM card and downloads the necessary data information of the SIM card into the communication terminal 200, and completes authentication operation of a carrier's mobile network by interacting with the cloud SIM card server 300, when performing authentication on the carrier's mobile network. The cloud SIM card is downloaded into a remote SIM card module of the mobile terminal and is used as a remote SIM card.

As another preferable embodiment of the present disclosure, when the cloud SIM card is a soft card, the cloud SIM card server 300 may select to send the authentication data of the soft card to the communication terminal 200, so that the communication terminal 200 has the capability of completing the authentication locally. The cloud SIM card is downloaded into the soft card module of the mobile terminal and is used as a soft card.

The cloud SIM card management server may be a server, and may also be a server cluster composed of several servers, or be a cloud computing service center that may store and process data.

In one embodiment of the present disclosure, the cloud SIM card server 300 is configured to receive various service requests sent by the card service transmitter 21 and/or send a response to the service request to the card service transmitter 21, wherein the response to the service request is a response made by the cloud SIM card server 300 according to various service requests sent by the received card service transmitter 21.

In one embodiment of the present disclosure, The service request may include device identification information, when the user uses the wireless local area network to perform wireless communication between the communication terminal 200 and the cloud SIM card server 300, each communication terminal 200 device may be identified due to the uniqueness of the device identification information of the communication terminal 200. Thus, when the service request sent by the communication terminal 200 carries the device identification information, the communication terminal 200 may be recognized according to the device identification information of the communication terminal 200. In particular, in this embodiment, the device identification information may be used to identify the communication terminal 200, the device identification information may be IMEI (International Mobile Equipment Identity), and may also be an identity card number or a telephone number of the user, it should be understood that the examples of the device identification information are merely for the convenience of description, the present disclosure is not limited thereto, as long as the purpose of identifying the communication terminal 200 in the communication network is achieved, a selection may be made according to actual situation.

In particular, in case of performing resource scheduling management on the various SIM cards on the communication terminal 200, when the user has multiple SIM cards to be used, due to the fact that the number of SIM cards that may be inserted into the communication terminal 200 is limited, an idle SIM card of the user may be inserted into the SIM card box and is used in the manner of cloud SIM card, the SIM card may be used by the user and may also be shared to others.

The SIM card box is a management device for achieving multi-card multi-standby. The user may realize remotely managing the states of the various SIM cards in the SIM card box through a device, and freely switching the upper limit and the lower limit of each of the various SIM cards by connecting the SIM card box to the power supply and the network wire, and inserting the various SIM cards into the SIM card box.

The SIM card resource scheduling management system may have a variety of application scenarios, which include, in particular, in scenario 1, a plurality of SIM card slots 30 are integrated into the non-modem side of the communication terminal 200, the user inserts the physical SIM card into the SIM card slot 30, and controls the physical SIM card arranged on the non-modem side to be loaded into the modem 50 through an application program, at this point, switching and using of the various physical SIM cards arranged in the SIM card slot 30 are realized by controlling the communication terminal 200.

In scenario 2, the user controls the e-SIM card fixedly arranged on the communication terminal 200 to be loaded into the modem 50 through the application program, at this point, switching between enabling and disabling of the e-SIM card is realized by controlling the communication terminal 200.

In scenario 3, the communication terminal 200 downloads cloud SIM card data into the cloud SIM card module 40 from the cloud SIM card server 300, and loads the cloud SIM card into the modem 50 to be used through the modem driver.

In scenario 4, the non-modem side of the communication terminal 200 is provided with a plurality of SIM card slots 30 and an e-SIM card is fixedly arranged on the non-modem side of the communication terminal 200, the user inserts the physical SIM card into the SIM card slot 30 or the modem, and the physical SIM card or the e-SIM card is controlled to be shared to the cloud SIM card server 300 through the application program, so that other device is enabled to use the physical SIM card and the e-SIM card arranged on the non-modem side, or use the physical SIM card and the e-SIM card inserted in the modem.

According to the plurality of application scenarios described above, this embodiment of the present disclosure further provides a plurality of usage methods applied to the SIM card resource management system. In this embodiment of the present disclosure, the application scenarios are mainly used for performing a card allocation operation on the cloud SIM card, performing an update operation on the SIM card, performing monitoring and alarming operation on the SIM card, performing an usage operation on the SIM card, and performing a sharing operation on the SIM card.

Embodiment Four

Figure 5:
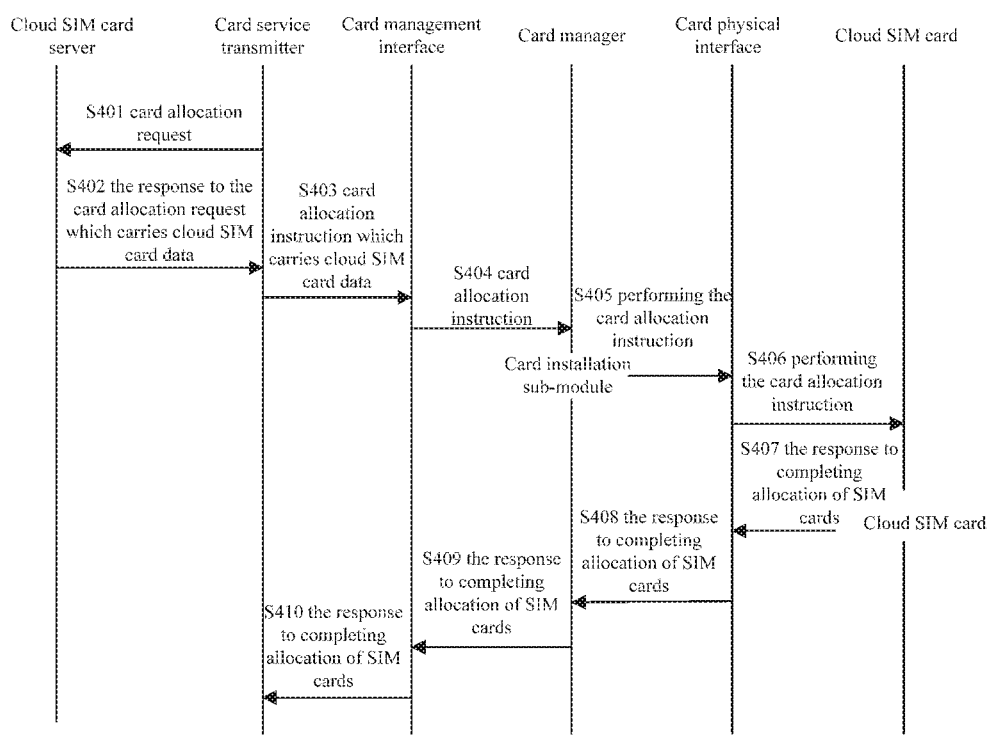
FIG. 5 illustrates a schematic flowchart of a SIM card allocation method provided by embodiment four of the present disclosure.

FIG. 5 illustrates a flowchart of a SIM (Subscriber Identity Module) card allocation method provided by this embodiment of the present disclosure, this SIM card allocation method is applied to a SIM card resource scheduling management system, and includes the following steps:

in a step of S401, transmitting a card allocation request to a cloud SIM card server 300 by a card service transmitter.

Wherein, when a user needs to use a communication terminal 200 to add a cloud SIM card, he/she uses the communication terminal 200 to send a SIM card allocation request to the cloud SIM card server 300, wherein the communication mode between the communication terminal 200 and the cloud SIM card server 300 includes but is not limited to GSM (Global System for Mobile Communications), GPRS (General Packet Radio Service), CDMA (Code Division Multiple Access), WCDMA (Wideband Code Division Multiple Access), LTE (Long Time Evolution), WLAN (Wireless Local Area Network), and Ethernet, the communication mode is not limited in the present disclosure.

Wherein it should be understood that the cloud SIM card may be a physical SIM card, a soft card arranged on the side of cloud SIM card server 300 or other type of SIM card (e.g., an e-SIM card, a multi-IMSI card, etc.) or other SIM card shared by other terminal device. It should be understood that, the examples of the cloud SIM card are merely for the convenience of interpretation and are not limited by the present disclosure, selection may be made according to actual situation.

In a step of S402, replying, by the cloud SIM card server 300, a response to SIM card allocation request to the card service transmitter according to the SIM card allocation request, wherein the response to SIM card allocation request carries the cloud SIM card data.

Wherein when the cloud SIM card server 300 receives the card allocation request sent by the card service transmitter, the stored cloud SIM card is obtained, and when the cloud SIM card has the cloud SIM card, the response to the SIM card allocation request which carries the cloud SIM card data is returned to the card service transmitter.

When the cloud SIM card server 300 is not provided with a cloud SIM card, a response to SIM card allocation request which doesn't carry the cloud SIM card data is returned, so that the communication terminal 200 is enabled to determine that the cloud SIM card server 300 cannot perform SIM card allocation operation due to insufficient cloud SIM cards.

In a step of S403, transmitting a card allocation instruction carrying the cloud SIM card data to a card management interface by the card service transmitter according to the response to the card allocation request.

Wherein, in the event that the card service transmitter receives the response to the SIM card allocation request sent by the cloud SIM card server 300, when response data responsive to the SIM card allocation request includes the cloud SIM card data, the response to the SIM card allocation request is determined as a successful state; otherwise, the response to the SIM card allocation request is determined as a failure state, at this point, information indicating that SIM card cannot be allocated from the cloud SIM card server 300 is displayed, and the user is informed that allocation of the SIM card is impossible.

The cloud SIM card data includes, but is not limited to, one or a combination of a card type, a telephone number, an ICCID (Integrated Circuit Card identity), an IMSI (International Mobile Sub scriber identity).

At this point, the card service transmitter sends a card allocation instruction carrying the cloud SIM card data to the card management interface according to the response to the SIM card allocation request.

In a step of S404, transmitting the SIM card allocation instruction to the card manager by the card management interface.

Wherein the card management interface is configured to provide a communication interface between the card service transmitter and the card manager, in this situation, the card management interface transmits the received SIM card allocation instruction to the card manager.

In a step of S405, calling a card physical interface to execute the SIM card allocation instruction by the card installation sub-module corresponding to the card manager.

In a step of S406, executing, by the card physical interface, a SIM card allocation instruction on the cloud SIM card module to write the cloud SIM card data into the cloud SIM card module, thereby installing and generating the required cloud SIM card.

Wherein the card manager 23 is instructed to correspondingly call the card physical interface to cause the card physical interface to write the cloud SIM card data carried in the SIM card allocation instruction into the cloud SIM card module connected with the card physical interface according to the SIM card allocation instruction, and install and generate a cloud SIM card according to the card type in the carried cloud SIM card data.

In a step of S407, replying a response to completing allocation of SIM card to the card physical interface, when writing the cloud SIM card data into the cloud SIM card module is completed.

Wherein in order to complete a cloud SIM card write operation, multiple interactions may be performed among the card manager, the card physical interface and the cloud SIM card module.

In a step of S408, sending the response to completing allocation of SIM card to the card manager by the card physical interface.

In a step of S409, sending the response to completing allocation of SIM card to the card management interface by the card manager.

In a step of S410, sending the response to completing allocation of SIM card to the card service transmitter by the card management interface, thereby completing SIM card allocation operation of the card service transmitter.

Wherein, after the card physical interface writes the cloud SIM card data carried in the SIM card allocation instruction into the cloud SIM card module and generates the cloud SIM card, the card management interface returns the response to completing allocation of SIM card to the card management interface, and the card management interface transmits the response to completing allocation of SIM card to the card service transmitter.

The SIM card allocation method provided by the present disclosure may write a cloud SIM card arranged on the cloud SIM card server 300 into the communication terminal 200 to realize installing and adding the cloud SIM card in the communication terminal 200.

Embodiment Five

Figure 6:
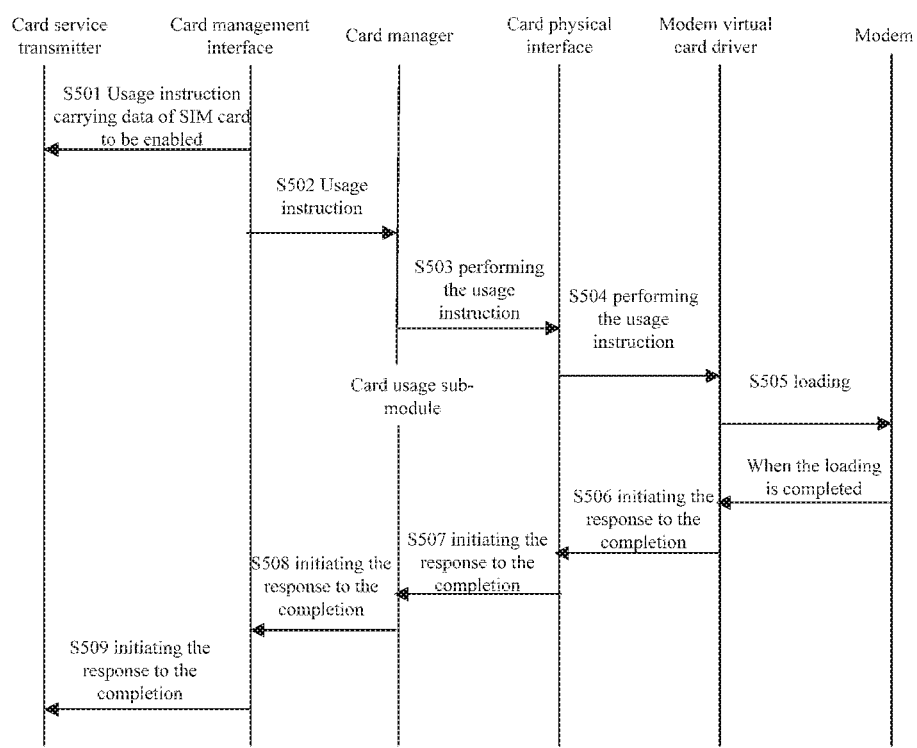
FIG. 6 illustrates a schematic flowchart of a method of using SIM card provided by embodiment five of the present disclosure.

FIG. 6 illustrates a flowchart of a method of using SIM card which is applied to a SIM (Subscriber Identity Module) card resource scheduling management system, and includes the following steps:

In a step of S501, sending an usage instruction carrying an identification of a SIM card to be enabled to a card management interface by the card service transmitter.

The SIM card to be enabled includes a cloud SIM card, a physical SIM card and an e-SIM (Embedded Subscriber Identity Module) card which are arranged on the non-modem side and a physical SIM card and an e-SIM card which are arranged on the modem, wherein the cloud SIM card is a SIM card which is downloaded into the cloud SIM card module from the cloud SIM card server 300 through a special channel by using a communication terminal 200.

When the user needs to use the communication terminal 200 to enable use of the SIM card arranged on the non-modem side, he/she uses the communication terminal 200 to control a card service transmitter to send the usage instruction so as to load the SIM card to be enabled into the modem 50. At this point, the card service transmitter sends the usage instruction to the card management interface, wherein the usage instruction carries the identification of the SIM card to be enabled.

In a step of S502, transmitting the usage instruction to a card manager 23 by the card management interface.

Wherein the card management interface is configured to provide an interface communication between the card service transmitter and the card manager, at this point, the card management interface transmits the received usage instruction to the card manager.

In a step of S503, calling the card physical interface to execute the usage instruction corresponding to the card manager.

In a step of S504, calling a modem virtual SIM card driver to execute the usage instruction by the card physical interface;

In a step of S505, loading the SIM card to be enabled into the modem 50 by the modem virtual SIM card driver.

Wherein the modem virtual SIM card driver provides a drive interface between the SIM card arranged on the non-modem side and the modem, at this point, the card physical interface calls the modem virtual SIM card driver to load the SIM card to be enabled into the modem 50 according to the received usage instruction, thereby realizing enabling the virtual SIM card to be enabled.

In a step of S506, when completing loading the SIM card to be enabled into the modem 50, sending a response of completion of enablement of the SIM card to the card physical interface by the modem virtual SIM card driver.

In a step of S507, the card physical interface sending the response of completion of enablement of the SIM card to the card manager.

In a step of S508, sending the response of completion of enablement of the SIM card to the card management interface by the card manager.

In a step of S509, sending the response of completion of enablement of the SIM card to the card service transmitter to complete enablement operation of the card service transmitter by the card management interface.

Wherein the modem virtual SIM card driver may need to read and write SIM card data many times when the SIM card to be enabled is loaded into the modem 50, which is implemented by following steps:

step 1, sending a request of reading and writing SIM card data to the card physical interface by the modem virtual SIM card driver;

step 2, performing the request of reading and writing SIM card data on a SIM card loaded into the modem 50 by the card physical interface;

step 3, when the operation of reading and writing SIM card data on the virtual SIM card is completed by the card physical interface, receiving a returned response to reading and writing SIM card data;

step 4, sending a response of reading and writing SIM card data to the modem virtual SIM card driver by the card physical interface;

wherein it should be noted that, when the SIM card to be enabled is a remote SIM card in a remote SIM card module, both the communication terminal 200 and the cloud SIM card server 300 are required to perform carrier's mobile network authentication operation to realize the use of the remote SIM card issued by the cloud SIM card server 300, in the process of loading the remote SIM card into the modem 50.

Furthermore, it needs to be noted that, when the number of SIM card resources that may be loaded into the modem 50 reaches an upper limit value, the user needs to use the communication terminal 200 to select a SIM card to be disabled in order that the modem releases the resource of the SIM card to be disabled, thereby realizing loading other physical SIM card or e-SIM card or cloud SIM card into the modem 50 to be enabled.

According to the method of using SIM card provided by the present disclosure, the SIM card may be loaded into the modem 50 to realize use of the SIM card by the communication terminal 200.

Embodiment Six

Figure 7:
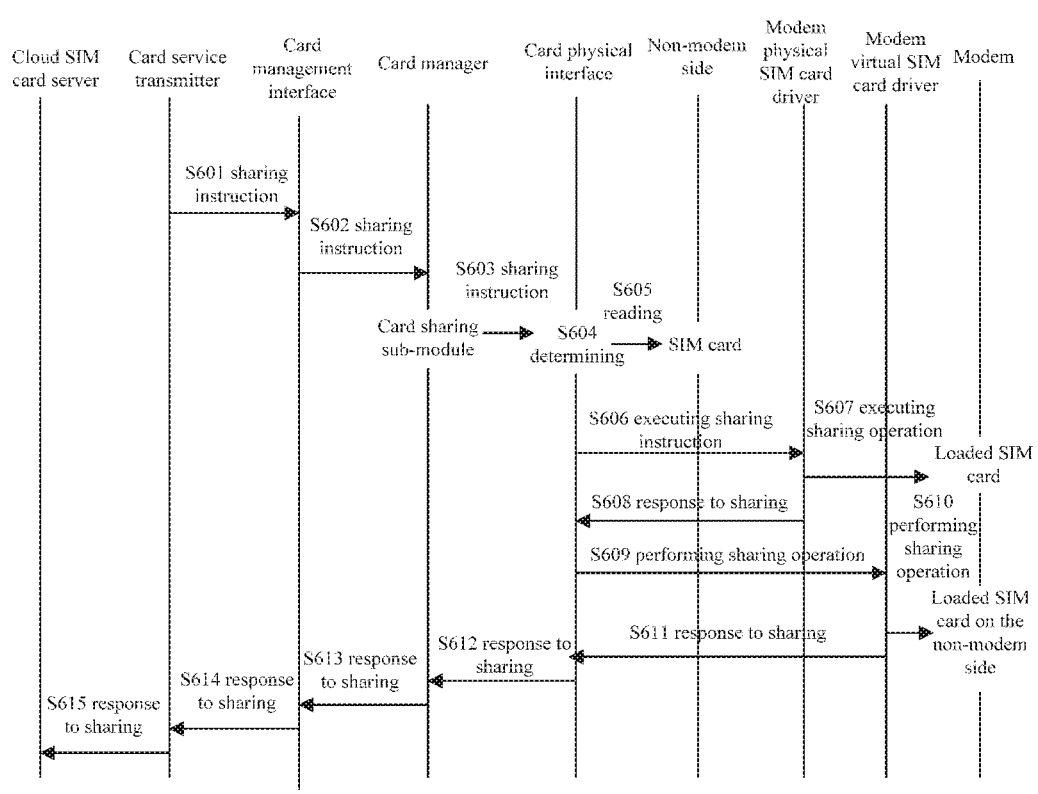
FIG. 7 illustrates a schematic flowchart of a method of sharing SIM card provided by embodiment six of the present disclosure.

FIG. 7 illustrates a flowchart of a SIM (Subscriber Identity Module) card sharing method which is applied to a SIM card resource scheduling management system, and includes the following steps:

In a step of S601, sending a sharing instruction to a card management interface by a card service transmitter, wherein the sharing instruction carries partial data of SIM card to be shared.

Wherein when the user needs to share the SIM card arranged on the non-modem side or the SIM card loaded into the modem 50 to a cloud SIM card server 300, he/she sends the sharing instruction to the card management interface through the communication terminal 200 in order that other communication terminal 200 downloads and use a shared SIM card arranged in the communication terminal 200 through the cloud SIM card server 300.

Wherein the SIM card arranged on the non-modem side includes a cloud SIM card, a physical SIM card and an e-SIM (Embedded Subscriber Identity Module) card which are arranged on the non-modem side; the SIM card loaded into the modem 50 includes a physical SIM card or an e-SIM card arranged in the modem, or a virtual SIM card, a physical SIM card and an e-SIM card arranged on the non-modem side and loaded into the modem 50.

Wherein the partial data of the SIM card includes, but is not limited to, one or a combination of a phone number, an ICCID (Integrated Circuit Card Identity), an IMSI (International Mobile Sub scriber Identification Number).

In a step of S602, transmitting the sharing instruction to the card manager 23 by the card management interface.

In a step of S603, sending the sharing instruction to the card physical interface by the card manager 23.

In a step of S604, determining the position and the type of the SIM card to be shared by the card physical interface;

Wherein when the SIM card to be shared is determined as the SIM card arranged on the non-modem side, a step S605 is performed; when the SIM card to be shared is determined as a SIM card loaded into the modem 50, a step S606 is performed; when the SIM card to be shared is determined as a SIM card arranged on the non-modem side and loaded into the modem 50, a step S609 is executed.

Wherein since the SIM card to be shared may be a SIM card arranged on the non-modem side, may be a SIM card loaded into the modem 50, and may also be a SIM card arranged on the non-modem side and loaded into the modem 50, the card physical interface needs to determine the position and the type of the SIM card to be shared when sharing the SIM card to be shared.

In a step of S605, reading necessary data of the SIM card arranged on the non-modem side by the card physical interface;

wherein the SIM card to be shared is determined as the SIM card arranged on the non-modem side, the card physical interface directly performs a sharing operation on the SIM card, the sharing operation may be sharing the SIM card itself or sharing some functions of the SIM card such as voice, data, and short message.

In a step of S606, calling the modem physical SIM card driver to execute the sharing instruction by the card physical interface;

wherein when the SIM card to be shared is a SIM card loaded into the modem 50, the modem physical SIM card driver is correspondingly called to cause the modem physical SIM card driver to execute the sharing instruction.

In a step of S607, executing the sharing instruction to perform a sharing operation on the corresponding SIM card by the modem physical SIM card driver according to the partial data of the SIM card to be shared in the sharing instruction;

wherein the modem physical SIM card driver provides a driver for operating the SIM card loaded into the modem 50, which may realize sharing, or enabling and disabling the SIM card loaded into the modem 50.

In a step of S608, replying a response of the sharing of the SIM card to the card physical interface by the modem physical SIM card driver;

In a step of S609, the card physical interface calls the modem virtual SIM card driver to execute the sharing instruction;

In a step of S610, executing a sharing instruction to perform a sharing operation on the corresponding SIM card by the modem virtual SIM card driver according to the partial data in the SIM card to be shared in the sharing instruction;

wherein the modem virtual SIM card driver provides a driver for enabling the SIM card arranged on the non-modem side to be operated on the modem, may realize loading the SIM card arranged on the non-modem side into the modem 50 to be used, or realize sharing the SIM card arranged on the non-modem side to the cloud SIM card server 300, or realize disabling the SIM card arranged on the non-modem side and loaded into the modem 50.

In a step of S611, replying the response to the sharing of the SIM card to the card physical interface by the modem virtual SIM card driver;

Wherein the modem virtual SIM card driver sends the response to the sharing of the SIM card to the card physical interface to enable the SIM card to be shared to the cloud SIM card server 300.

It should be noted that, step S605, steps S606-S608, and steps S609-S611 are three parallel steps that perform corresponding implementations according to the positions and the types of the SIM cards to be shared determined by the card management interface. The steps S605, S606, and S611 are executed arbitrarily, step S612 is performed after step S605 or step S606, or step S611 is executed.

In a step of S612, sending the response to the sharing of the SIM card to the card manager by the card physical interface;

In a step of S613, sending the response to the sharing of the SIM card to the card management interface by the card manager.

In a step of S614, sending the response to the sharing of the SIM card to the card service transmitter by the card management interface.

In a step of S615, sending the response to the sharing of the SIM card to the cloud SIM card server 300 to enable the SIM card to be shared in the cloud SIM card server 300 by the card service transmitter;

according to the SIM card sharing method provided by the present disclosure, the SIM card arranged on the communication terminal 200 may be shared to the cloud SIM card server 300, so that other communication terminal 200 may download and use the shared SIM card arranged on the communication terminal 200 through the cloud SIM card server 300.

Embodiment Seven

Figure 8:
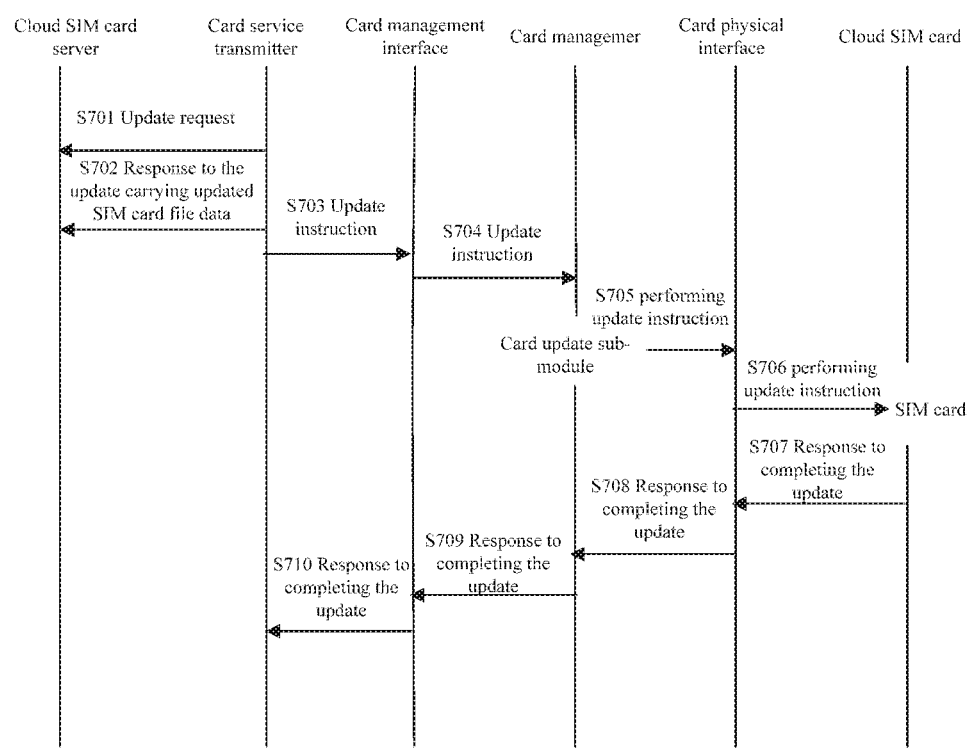
FIG. 8 illustrates a schematic flowchart of a method of updating SIM card provided by embodiment seven of the present disclosure.
Figure 9:
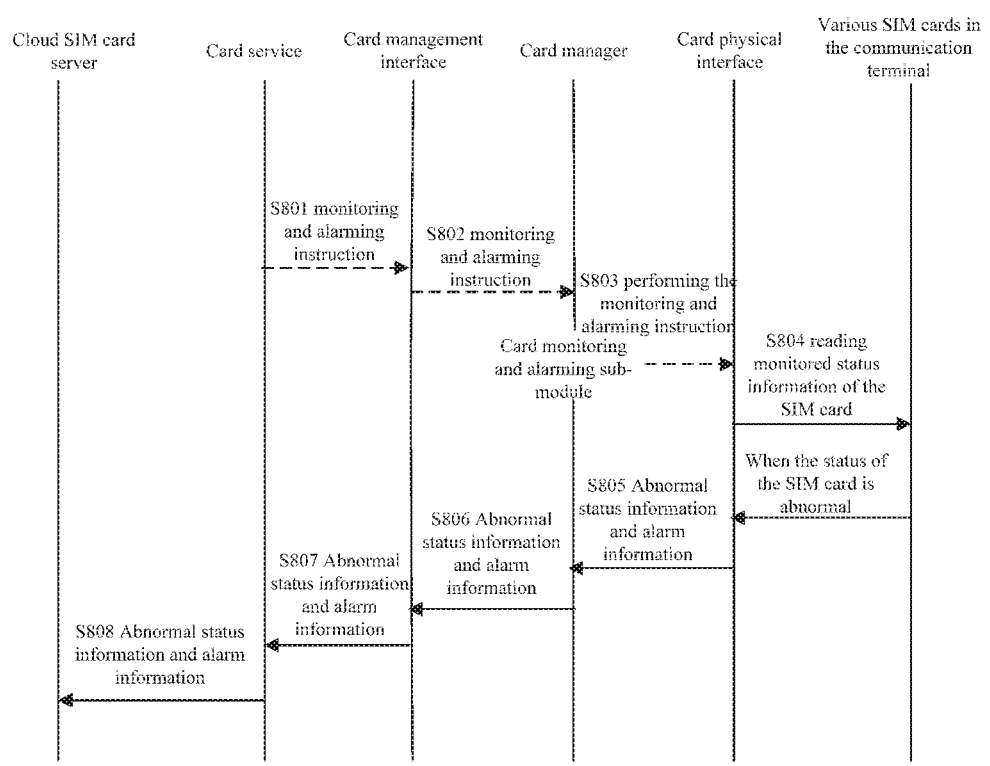
FIG. 9 illustrates a schematic flowchart of a SIM card monitoring and alarming method provided by embodiment eight of the present disclosure.

FIG. 8 illustrates a flowchart of a method of updating SIM card applied to a SIM card resource scheduling management system, which includes the following steps:

In a step of S701, sending an update request to a cloud SIM card server 300 by a card service transmitter.

Thus, when the user needs to update file data of the SIM card in a communication terminal 200, he/she uses the communication terminal 200 to send an update request to the cloud SIM card server 300, wherein communication mode between the communication terminal 200 and the cloud SIM card server 300 includes, but is not limited to, GSM (Global System for Mobile Communications), GPRS (General Packet Radio Service), CDMA (Code Division Multiple Access), WCDMA (Wideband Code Division Multiple Access), LTE (Long Term Evolution), WLAN (Wireless Local Area Network), and Ethernet, etc., the communication mode is not limited in the present disclosure.

Wherein the update request includes SIM card identification information, request information, and device identification information of the communication terminal 200.

In a step of S702, replying a response to the update request which carries updated SIM card file data by the cloud SIM card server 300 according to the update request.

Wherein the update request sent by the card service transmitter is received by the cloud SIM card server 300, the cloud SIM card server 300 obtains the SIM card that needs to be updated in the update request, updates the file data of the SIM card correspondingly, and replies the response to the update request which carries updated SIM card file data to the card service transmitter.

In a step of S703, sending an update instruction to the card management interface by the card service transmitter according to the response to the update request;

At this point, the card service transmitter sends an update instruction carrying the SIM card file data to the card management interface according to the response to the update request.

In a step of S704, transmitting the update instruction to a card manager 23 by the card management interface;

Wherein the card management interface is configured to provide an interface communication between the card service transmitter and the card manager 23, at this point, the card management interface transmits the received update instruction to the card manager 23.

In a step of S705, calling a card physical interface to execute the update instruction by the card manager 23 according to the update instruction;

In a step of S706, executing an update instruction on the SIM card corresponding to the SIM card identification information to write the SIM card file data into the corresponding SIM card by the card physical interface;

Wherein the card manager 23 is instructed to call the card physical interface correspondingly according to the update instruction carrying the SIM card file data in order that the card physical interface writes the SIM card file data carried in the update instruction into the corresponding SIM card in the cloud SIM card module.

In a step of S707, when updating of the SIM card file data is completed, returning a response to completing the updating of the SIM card file data to the card physical interface.

In a step of S708, sending the response to completing the updating of the SIM card file data to the card manager by the card physical interface;

in a step of S709, sending the response to completing the updating of the SIM card file data to the card management interface by the card manager 23;

in a step of S710, sending the response to completing the updating of the SIM card file data to the card service transmitter to complete the update operation of the card service transmitter by the card management interface;

wherein the card manager 23 is instructed to send the response to completing the updating of the SIM card file data according to a card allocation instruction to the card management interface in order that the card management interface transfers the response to completing the updating of the SIM card file data to the card service transmitter to complete the update operation sent by the card service transmitter.

In the method of updating SIM card provided by the present disclosure, the update request is sent to the cloud SIM card server 300, and the updated SIM card file data sent by the cloud SIM card server 300 is written into the SIM card of the communication terminal 200 to realize data update of SIM card in the communication terminal 200.

Embodiment Eight

FIG. 8 illustrates a flowchart of a SIM (Subscriber Identity Module) card monitoring and alarming method which is applied to a SIM card resource scheduling management system and includes the following steps:

In a step of S801, sending a monitoring and alarming instruction to a card management interface by the card service transmitter.

Wherein when a status of each SIM card in the communication terminal 200 needs to be monitored, the user may send the monitoring and alarming instruction to the card management interface through the card service transmitter, wherein status information of the SIM card includes, but is not limited to, whether the SIM card is inserted, whether the SIM card is scrapped, whether a network is connected, the remaining telephone charge, the remaining service life, and the like.

In a step of S802, transmitting the monitoring and alarming instruction to the card manager 23 by the card management interface.

In a step of S803, controlling a card physical interface to execute the monitoring and alarming instruction by the card manager 23.

In a step of S804, reading the status information of the monitored SIM card to realize monitoring the status of the SIM card by the card physical interface.

Wherein the card physical interface may perform reading and writing operation on the various SIM cards and obtain the status information of each SIM card in real time to realize monitoring the state of the SIM card is realized, wherein the SIM card to be monitored includes a physical SIM card, an e-SIM (Embedded Subscriber Identity Module) card, a soft card and a remote SIM card, wherein the SIM card may be loaded into a modem and is used, moreover, the SIM card may also be arranged on a non-modem side to be used, and the SIM card in a monitoring state is not limited in this embodiment.

In a step of S805, sending abnormal status information and alarm information to the card manager 23 when the card physical interface detects that the status of the SIM card is abnormal.

Wherein when the card manager 23 detects that the status information of any SIM card exceeds a preset status range, the card manager 23 determines that the status of the SIM card is abnormal and sends the specific information, the abnormal status information, and the alarm information of the SIM card in the abnormal state to the card manager.

In a step of S806, sending the abnormal status information and the alarm information to the card management interface by the card manager 23.

In a step of S807, transmitting, by the card management interface, the abnormal status information and the alarm information to the card service transmitter in order that the card service transmitter performs an alarming according to the abnormal state of the SIM card.

Wherein when the card manager 23 monitors that the status information of the SIM card differs from a preset range of status, at this time, the card manager 23 determines that the status of the SIM card is abnormal and sends the abnormal status information and the alarm information to the card management interface, the card management interface transmits the received abnormal status information and the alarm information to the card service transmitter to notify the user of the abnormal state of the SIM card through the communication terminal 200, in this way, the user may further perform an abnormity diagnosis on the SIM card.

In other embodiment of the present disclosure, the communication terminal 200 may not send the monitoring and alarming instruction, that is, steps S801-S803 may not be necessarily implemented. In this situation, the card physical interface directly reads status information of each SIM card and sends the status information to the card monitor to enable the card monitor to realize monitoring the status of the SIM card and performing alarming when the status is abnormal.

In a step of S808, reporting the abnormal status information and the alarm information to the cloud SIM card server 300 by the card service transmitter.

Wherein the card service transmitter further reports the abnormal status information and the alarm information to the cloud SIM card server 300 in order that the cloud SIM card server 300 records abnormities of the SIM card in abnormal state.

The SIM card monitoring and alarming method provided by the present disclosure may monitor the status information of each SIM card of the communication terminal 200 and perform alarming, when the state of the SIM card is abnormal.

In other embodiment of the present disclosure, a SIM card query method, a SIM card deletion method, a method of disabling SIM card, a method of stopping sharing SIM card, a SIM card data modification method and the like may also be provided according to the application scenario of the SIM card resource management system, these various methods are implemented according to the various functional modules of the SIM card resource management system and are not repeatedly described herein.

The foregoing are only selectable embodiments of the present disclosure, and should not be regarded as limitations to the present disclosure. For the person of ordinary skill in the art, various modifications and changes may be made in the present disclosure. Any modification, equivalent replacement, improvement, and the like, which are made within the spirit and the principle of the present disclosure, should all be included in the protection scope of the present disclosure.

What is claimed is:

1. A device of managing and scheduling SIM card resource, comprising: a card service transmitter configured to send various service instructions to a card management interface so as to transmit the various service instructions to a card manager through the card management interface; the card manager, which is configured to call a card physical interface to realize various service functions according to received various service instructions, thereby performing resource management on a SIM card; the card physical interface, which is configured to perform an operation on the SIM card arranged on a non-modem side, and to call a modem virtual SIM card driver in a modem driver to load the SIM card arranged on the non-modem side into the modem or to call a modem physical SIM card driver in the modem driver to perform an operation on the SIM card loaded into the modem.

2. The device of managing and scheduling SIM card resource according to claim 1, wherein the various service instructions comprise a card allocation instruction that instructs the card manager to call the card physical interface to write cloud SIM card data issued by a cloud SIM card server into a cloud SIM card module of the card physical interface, to generate a SIM card as determined by the card service transmitter.

3. The device of managing and scheduling SIM card resource according to claim 1, wherein the various service instructions further comprise a usage instruction that instructs the card manager to call the card physical interface in order that the card physical interface calls a modem virtual SIM card driver of the modem driver to load the SIM card arranged on the non-modem side into the modem to be used.

4. The device of managing and scheduling SIM card resource of claim 1, wherein the various service instructions further comprise a sharing instruction that instructs the card manager to call the card physical interface in order that the card physical interface calls the card physical interface to share the SIM card arranged on the non-modem side to the cloud SIM card server, or to call the modem physical SIM card driver to share the SIM card loaded into the modem to the cloud SIM card server.

5. The device of managing and scheduling SIM card resource of claim 1, wherein the various service instructions further comprise a card update instruction that instructs the card manager to call the card physical interface to update SIM card data determined by the card service transmitter.

6. The device of managing and scheduling SIM card resource according to claim 1, wherein the various service instructions further comprise a monitoring and alarming instruction that instructs the card manager to call the card physical interface to monitor statuses of various SIM cards determined by the card service transmitter and send out an alarm when an abnormal status of a SIM card is monitored.

7. A communication terminal, wherein the communication terminal is provided with the device of managing and scheduling SIM card resource according to claim 1.

8. A system of managing and scheduling SIM card resource, comprising: the communication terminal according to claim 7, and a cloud SIM card server configured to receive various service requests sent by the card service transmitter and/or send out responses to the service requests to the card service transmitter, wherein the responses to the service requests are responses made by the cloud SIM card server according to the received various service requests sent by the card service transmitter.

* * * * *